(12) United States Patent
Wong et al.

(10) Patent No.: US 12,355,202 B2
(45) Date of Patent: Jul. 8, 2025

(54) FIBER LASER SYSTEM

(71) Applicant: THE UNIVERSITY OF HONG KONG, Hong Kong (HK)

(72) Inventors: Kenneth Kin Yip Wong, Hong Kong (HK); Cihang Kong, Hong Kong (HK); Xiaoming Wei, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 643 days.

(21) Appl. No.: 17/771,218

(22) PCT Filed: Oct. 21, 2020

(86) PCT No.: PCT/CN2020/122308
§ 371 (c)(1),
(2) Date: Apr. 22, 2022

(87) PCT Pub. No.: WO2021/078130
PCT Pub. Date: Apr. 29, 2021

(65) Prior Publication Data
US 2022/0393421 A1    Dec. 8, 2022

Related U.S. Application Data

(60) Provisional application No. 62/924,751, filed on Oct. 23, 2019.

(51) Int. Cl.
*H01S 3/1112* (2023.01)
*H01S 3/00* (2006.01)
(Continued)

(52) U.S. Cl.
CPC ........ *H01S 3/06716* (2013.01); *H01S 3/0057* (2013.01); *H01S 3/0092* (2013.01);
(Continued)

(58) Field of Classification Search
CPC .. H01S 3/06716; H01S 3/0057; H01S 3/0092; H01S 3/10061; H01S 3/10092;
(Continued)

(56) References Cited

U.S. PATENT DOCUMENTS 6,256,432 B1 * 7/2001 Jeon .................... H04B 10/299
                                                            385/24
10,281,331 B2    5/2019 Alfano et al.
(Continued)

OTHER PUBLICATIONS

International Search Report and Written Opinion for International Application No. PCT/CN2020/122308 mailed on Jan. 20, 2021, 7 pages.

*Primary Examiner* — Xinning (Tom) Niu
(74) *Attorney, Agent, or Firm* — Amin, Turocy & Watson, LLP

(57) ABSTRACT

The present invention provides a fiber laser system, comprising: a master laser cavity for generating a master laser beam; a beam splitter for splitting the master laser beam into a first beam for generating a first color pulsed laser beam and a second beam for generating a second color pulsed laser beam; and a synchronization component configured to synchronize the first color pulsed laser beam and a second color pulsed laser beam based on coherent wavelength generation.

16 Claims, 3 Drawing Sheets

(51) Int. Cl.
*H01S 3/067* (2006.01)
*H01S 3/10* (2006.01)
*H01S 3/16* (2006.01)

(52) U.S. Cl.
CPC ...... *H01S 3/10061* (2013.01); *H01S 3/10092* (2013.01); *H01S 3/1112* (2013.01)

(58) Field of Classification Search
CPC ...... H01S 3/1112; H01S 3/005; H01S 3/0071; H01S 3/2391; H01S 3/06712; H01S 3/1608; H01S 3/06791; H01S 3/1618; G01J 3/10; G01J 3/44
See application file for complete search history.

(56) References Cited

U.S. PATENT DOCUMENTS

| | | | |
|---|---|---|---|
| 2007/0088219 A1* | 4/2007 | Xie | G01N 21/65 600/476 |
| 2011/0282166 A1* | 11/2011 | Chen | A61B 5/0084 600/478 |
| 2016/0231640 A1* | 8/2016 | Inoue | H01S 3/0078 |
| 2016/0240994 A1* | 8/2016 | Zach | H01S 5/4087 |

* cited by examiner

FIBER LASER SYSTEM

TECHNICAL FIELD

This invention belongs to the field of laser technology and relates to fiber laser systems, especially to a fiber laser system for pump-probe applications.

BACKGROUND

Chemical-specific and non-destructive examination has long been desired for material inspections and biomedical researches. Among various techniques, the popular optical pump-probe method reveals the chemical signatures with excellent temporal and spectral resolutions. Its principle is to excite the sample of interest with a pump laser pulse, and detect the change induced with an ultra-stable synchronized probe laser pulse. However, the extended applications of pump-probe technologies have long been hindered by the expensive solid-state laser sources associated with the environmentally-sensitive operations and large footprints. Fiber-based ultrafast lasers can potentially overcome these shortcomings, but have not yet been fully exploited for pump-probe applications, because current implementations suffer from the limitations of low power spectral density and intensity stability degradation.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

Disclosed herein are novel dual-color low noise picosecond (ps) and/or femtosecond (fs) fiber laser systems that provide excellent performance, in terms of intensity stabilities, power scalability and extended wavelength tunability. More importantly, the laser source described herein is compact and can be directly integrated to an existing imaging or spectroscopic system. Different from prior realizations where the synchronized pulse generation is seeded by noise, herein the synchronization between the two-color pulsed laser beams is based on the coherent wavelength generation (CWG) in the fashion of a passive- and self-stabilization, which gives rise to superior stability. High power amplification implemented at the laser output enables a power spectral density in the level of Watt/nm. Moreover, the synchronization mechanism can be applied regardless of the wavelength, hence, the working range of the systems described herein can be extended to multiple wavelength bands.

Pump-probe measurement is performed with synchronized solid-state lasers which are bulky and environmentally sensitive, or fiber lasers which are unstable and insufficient in power. The laser source consists of two portions: a pump beam is used to excite the sample, generating a non-equilibrium state, and a probe beam is used to monitor the pump-induced changes in the optical constants of the sample.

A novel dual-color low noise picosecond fiber laser system that provides excellent performance, in terms of intensity stabilities, power scalability and extended wavelength tunability is described herein. More importantly, the laser source is compact and can be directly integrated to an existing imaging or spectroscopic system. The synchronization between the two-color pulsed laser beams is based on the coherent wavelength generation (CWG) in the fashion of a passive- and self-stabilization, which gives rise to superior stability. High power amplification implemented at the laser output enables a power spectral density in the level of Watt/nm. Moreover, the synchronization mechanism can be applied regardless of the wavelength, hence, the working range of this system can be extended to multiple wavelength bands.

The low-noise and self-synchronized two-color pulsed fiber laser system is assisted by coherent wavelength generation (CWG) through cross-phase modulation (XPM), which provides excellent stability. The laser system herein has higher output power spectral density and is compact.

In an aspect, the present invention provides a fiber laser system, comprising:
  a master laser cavity for generating a master laser beam;
  a beam splitter for splitting the master laser beam into a first beam for generating a first color pulsed laser beam and a second beam for generating a second color pulsed laser beam; and
  a synchronization component configured to synchronize the first color pulsed laser beam and a second color pulsed laser beam based on coherent wavelength generation.

The fiber laser system according to the present invention, preferably, each of the first pulsed laser beam and the second pulsed laser beam independently has a pulse width of 10 picoseconds or less or 10 femtoseconds or less.

The fiber laser system according to the present invention, preferably, each of the first pulsed laser beam and the second pulsed laser beam independently has a wavelength from 900 nm to 2200 nm.

The fiber laser system according to the present invention, preferably, the first pulsed laser beam is a Stokes beam, and the second pulsed laser beam is a pump beam.

The fiber laser system according to the present invention, preferably, the master laser cavity is a passively mode-locked fiber laser.

The fiber laser system according to the present invention, preferably, the master laser cavity comprises a piece of ytterbium-doped fiber, a drop-in polarization controller and a fiber-based optically integrated module.

The fiber laser system according to the present invention, preferably, the master laser cavity further comprises a photodiode for generating a system trigger signal.

The fiber laser system according to the present invention, preferably, the synchronization component is a coherent wavelength generation oscillator.

The fiber laser system according to the present invention, preferably, the coherent wavelength generation oscillator comprises a piece of erbium-doped fiber, a drop-in polarization controller, a fiber-based optically integrated module and a wavelength-division multiplexing coupler; wherein the wavelength-division multiplexing coupler is used to receive external injections.

The fiber laser system according to the present invention, preferably, the beam splitter is a fiber optic coupler.

The fiber laser system according to the present invention, preferably, further comprising a first double-cladded fiber amplifier for the first color pulsed laser beam and a second double-cladded fiber amplifier for the second color pulsed laser beam.

The fiber laser system according to the present invention, preferably, further comprising a dichroic mirror for spatially combining the first color pulsed laser beam and the second color pulsed laser beam.

The fiber laser system according to the present invention, preferably, further comprising a delay line for temporally overlapping the first color pulsed laser beam and the second color pulsed laser beam.

In another aspect, the present invention provides s method for pump-probe applications with the fiber laser system above, comprising:

splitting a master laser beam into a first beam for generating a first color pulsed laser beam and a second beam for generating a second color pulsed laser beam; and synchronizing the first color pulsed laser beam and a second color pulsed laser beam based on coherent wavelength generation.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Disclosed herein are dual-color low noise picosecond fiber laser systems to provide highly-stable pulsed laser operating at at least two wavelengths. Both lasers can be amplified to Watt-level power. The laser can be directly applied as the source for pump-probe spectroscopy or microscopy without balance detection. The laser source specifically designed for coherent Raman scattering (CRS) microscopy using pump-probe detection method is demonstrated below. By convention, in CRS microscopy, the pump beam is named as the Stokes beam, while the probe beam is named as the pump beam. CRS microscopy typically requires two-color excitation: a high frequency beam is referred to as the pump beam, while the low frequency beam is referred to as the Stokes beam. Stimulated Raman scattering (SRS) microscopy is one type of CRS microscopy that utilizes a pump-probe detection method. As described in the configuration of FIG. 1, the Stokes beam is used as pump beam in pump-probe detection, while pump beam is used as probe beam in pump-probe detection.

Figure 1:
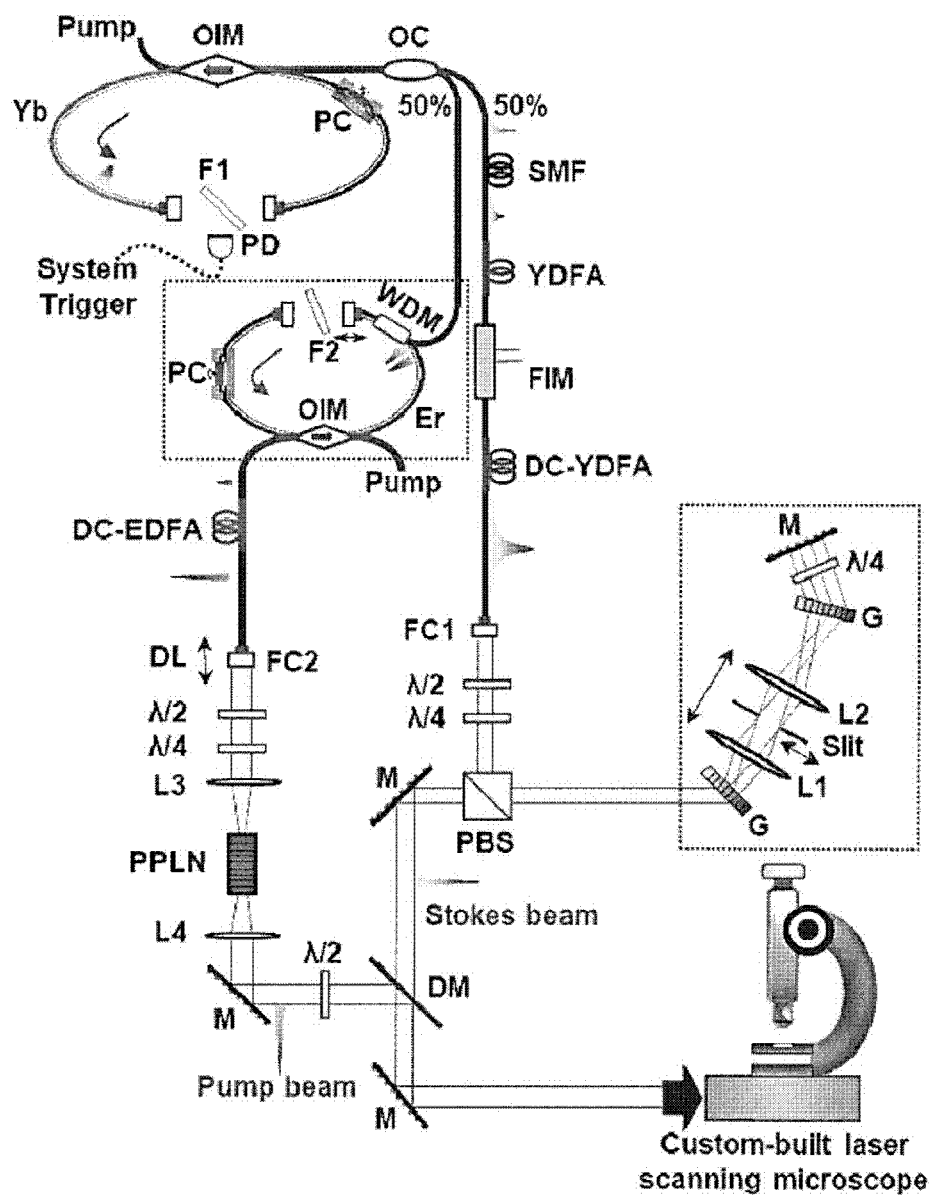
FIG. 1 is a schematic diagram of a two-color pulsed fiber laser in accordance with an embodiment herein.

The schematic diagram of the laser source is shown in FIG. 1. In the dual-color laser system, there are four parts: 1) passive mode-locking at 1 μm (Stokes wavelength); 2) optical synchronization of 1.5 μm; 3) pulse amplification and frequency doubling of the 1.5 μm light to ~790 nm (pump wavelength); and 4) spatial and temporal delay management.

1) The Stokes beam in the system is initially generated from the master laser cavity, which is constructed from a short piece of ytterbium-doped fiber (Yb), a drop-in polarization controller (PC) and a fiber-based optically integrated module (OIM) that provides polarization-sensitive isolation, pump/signal multiplexing and signal extraction. Passive mode-locking is implemented by the nonlinear polarization rotation (NPR), a reliable technique for generating self-starting and stable fs pulses in the all-normal dispersion regime. The output pulse train has an average power of ~20 mW and a fundamental repetition rate (FRR) of 80 MHz. Its output is split into two parts by using a 50:50 fiber optic coupler (OC), which feeds the Stokes and pump beam branches, respectively. Here, a system trigger signal is generated by using a photodiode (PD) that receives a leaked beam from the master laser.

2) The remaining power of the master fs laser is injected into the CWG oscillator, highlighted by the upper left dotted rectangle in FIG. 1, for generating stable self-synchronized laser pulses at 1.5 μm that are ultimately utilized as the pump beam. The CWG oscillator constructed with erbium-doped fiber (Er) has a similar structure as that of the master laser cavity, except that an additional wavelength-division multiplexing (WDM) coupler is used to receive the external injection. Without the external injection, the CWG oscillator operates in the quasi-continuous wave (CW) regime. Once the 1.0 μm laser beam is injected, the CWG oscillator is forced to generate a stable ps pulse train synchronized with the Stokes beam, resulting from a combined effect of the NPR pulse compression, XPM and chromatic dispersion.

3) For Stokes beam amplification, 50% of the fs pulse generated at 1.0 μm wavelength is amplified by using an FCPA scheme. To this end, the fs pulses are first linearly chirped in a single-mode fiber (SMF, 50 m), after which the chirped pulses are pre-amplified by a core-pumped Yb-doped fiber amplifier (YDFA). The pulses are subsequently modulated by a 20 MHz sinusoidal waveform using an in-line fiber-coupled intensity modulator (FIM), which achieves an intensity modulation depth of >20 dB. The average power of the chirped pulses is further amplified to >1.0 W by a double-cladding YDFA (DC-YDFA) that is cladding-pumped by a cost-effective multimode fiber-coupled pump laser diodes (MMFPLD). The amplified laser beam is launched into the free space through a fiber collimator (FC1) for pulse compression. The pulse compressor, which is shown inside the lower right dotted rectangle in FIG. 1, is constructed from a grating (G) pair and an optical telescope (L1 and L2). A slit is placed at the focal plane of L1 to perform narrowband spectral filtering.

The synchronized laser pulse train at 1.5 μm is then amplified to about 1 W by a double-cladding erbium/ytterbium-doped fiber amplifier (DC-EDFA). Here, the FCPA is not utilized since ps pulses are less sensitive to the fiber nonlinearities than fs pulses in the Stokes beam. The optical wavelength of the amplified 1.5 μm pulse train is frequency-doubled to the visible regime by the second-harmonic generation (SHG) in a periodically poled lithium niobate (PPLN) crystal, and serves as the pump beam.

4) After spatial and temporal overlapping of the pump and Stokes beams using a dichroic mirror (DM) and an optical delay line (DL), the combined beams are coupled into our custom-built laser scanning microscope.

Referring back to FIG. 1, FIG. 1 is a schematic diagram of the two-color pulsed fiber laser. A passively mode-locked fiber laser at 1.0 μm generates an fs pulse train at a repetition rate of 80 MHz. Its output is split into two branches by a fiber optic coupler (OC), respectively, for generating the Stokes and pump beams. After spatially combining Stokes and pump beams by a dichroic mirror (DM) and temporally overlapping them by a delay line (DL), the two-color laser beams are launched into a custom-built laser scanning microscope.

Based on the two-color pulsed fiber laser shown in FIG. 1, a method for pump-probe applications comprises the following steps:
splitting the master laser beam into two branches for generating the Stokes and pump beams;
synchronizing the Stokes and pump beams based on coherent wavelength generation;
spatially combining Stokes and pump beams and temporally overlapping them; and
launching the two-color laser beams into a custom-built laser scanning microscope.

In FIG. 1, the following abbreviations are employed: DC-EDFA: double-cladding erbium/ytterbium-doped fiber amplifier; DC-YDFA: double-cladding ytterbium-doped fiber amplifier; Er: erbium-doped fiber; F: filter; FC: fiber collimator; FIM: fiber-coupled I
ntensity modulator; G: grating; L: lens; M: mirror; OIM: fiber-based optically integrated module; PBS: polarizing beam splitter; PC: polarization controller; PD: photodiode; PPLN: periodically p
oled lithium niobate crystal; SMF: single-mode fiber; WDM: wavelength-division multiplexing coupler; XPM: cross-phase modulation; Yb: ytterbium-doped fiber; YDFA: ytterbium-doped fiber amplifier; $\lambda/2$: half-wave plate; and $\lambda/4$: quarter-wave plate.

In an embodiment, a synchronized dual-color low noise picosecond pulsed fiber laser system for pump-probe applications is described. In this design, the synchronization is based on coherent wavelength generation (CWG) in the fashion of passive- and self-stabilization, which gives rise to superior stability. Furthermore, double-cladded fiber amplification in the synchronized dual-color low noise picosecond pulsed fiber laser system gives rise to a high power spectral density output (Watt-level per nm). The synchronization scheme can be applied to multiple wavelength bands. Its versatility enables high contrast and fast pump-probe imaging and spectroscopic measurement without complicated noise reduction by applying balanced detection schemes.

In another embodiment, provided herein are methods and systems for constructing a fs all-fiber laser cavity using a single element.

In another embodiment, provided herein are methods and systems for constructing a compact dual-color fiber laser source that replaces the conventional bulky solid-state laser sources.

In another embodiment, provided herein are methods and systems for passively synchronizing dual-color pulsed laser beams based on coherent wavelength generation, with excellent intensity stability and low timing jitter.

In another embodiment, provided herein are methods and systems for generating wavelength-tunable two-color laser beams.

In another embodiment, provided herein are methods and systems for generating both fs and ps pulses from the same laser system for nonlinear bioimaging using different contrast. In one embodiment, an ultrashort laser pulse means a laser pulse that is 100 picoseconds (ps) or less or 300 femtoseconds (fs) or less. In another embodiment, an ultrashort laser pulse means a laser pulse that is 10 picoseconds (ps) or less or 100 femtoseconds (fs) or less. In yet another embodiment, an ultrashort laser pulse means a laser pulse that is a picosecond (ps) or less or 10 femtoseconds (fs) or less.

In another embodiment, provided herein are methods and systems for generating Watt-level picosecond pulses using double-cladded gain fiber and cladding-pump scheme, which is cost-effective and power efficient.

In another embodiment, provided herein are methods and systems for synchronizing any existing lasers with fiber lasers that covers wavelengths from 900 nm to 2200 nm. In yet another embodiment, provided herein are methods and systems for synchronizing any existing lasers with fiber lasers that covers wavelengths from 1000 nm to 2000 nm.

In another embodiment, provided herein are methods and systems for performing pump-probe detection without balanced detectors, which greatly reduces the system complexity.

In another embodiment, provided herein are methods and systems for applying the laser source to pump-probe microscopy with high spatial and temporal resolution.

For example, one application of using the synchronized dual-color low noise picosecond pulsed fiber laser system is imaging the human body such as brain imaging. Another application involves using the synchronized dual-color low noise picosecond pulsed fiber laser system in Stimulated Raman Scattering (SRS) coherent imaging systems.

EXAMPLES

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

In a study, a dual-color laser source specifically designed for coherent Raman scattering microscopy was implemented, which makes use of a pump-probe detection method.

Figure 2:
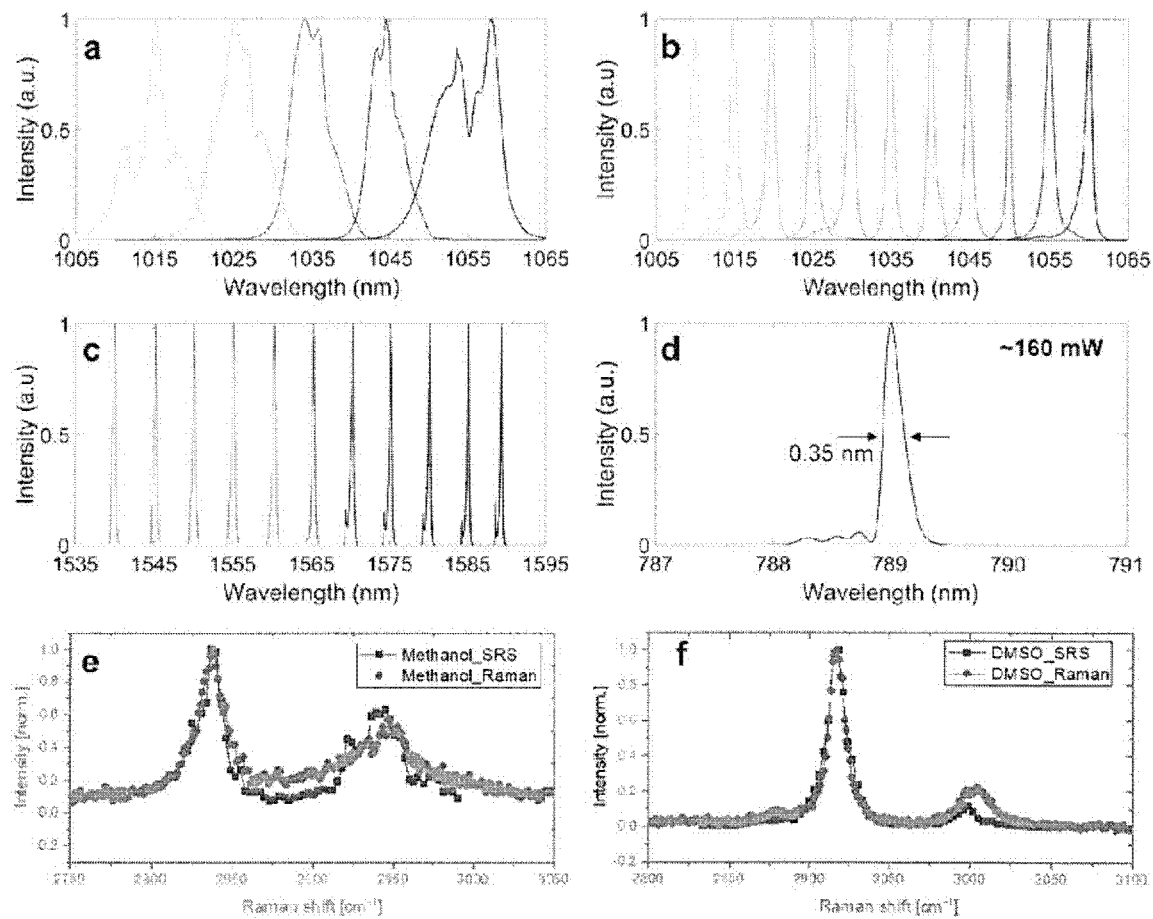
FIG. 2 shows a series of six spectral characteristics of a two-color pulsed fiber laser in accordance with an embodiment herein.

FIG. 2 shows the spectral performance of the two-color pulsed fiber laser. The center wavelength of the master fs laser can be coarsely tuned between 1010 nm and 1060 nm (FIG. 2a), with a bandwidth of about 8.0 nm defined by the intracavity filter (F1). A fine spectral tuning, i.e., FIG. 2b, is obtained by translating the slit in the pulse compressor, which enables a continuous wavelength scan with an effective bandwidth of about 1.0 nm. On the other hand, the center wavelength of the CWG oscillator can be continuously fine-tuned from 1540 nm to 1590 nm with a bandwidth of <1.0 nm (FIG. 2c). FIG. 2d showcases a typical SHG spectrum that is frequency-doubled from 1578 nm and has a spectral width of 0.35 nm, corresponding to a transform-limited Gaussian pulse width of 2.6 ps. The average power of the pump beam after the SHG crystal is >160 mW, sufficient for CRS imaging. It should be noted that an SHG output power of >1 W can potentially be obtained by further optimizing the SHG efficiency of the PPLN crystal. Current two-color pulsed fiber laser can cover a broad range of Raman resonances in the high wavenumber region, from 2700 to 3550 cm-1, including the CH2 stretching resonance at 2845 cm-1 predominantly associated with lipids as well as the resonance of cellular proteins at 2920 cm-1. To demonstrate hyperspectral CRS capability, the SRS spectra of standard samples, such as dimethyl sulfoxide (DMSO) and methanol, are measured using this fiber laser sources and compared to spontaneous Raman spectra (FIG. 2e,f).

Specifically referring to FIG. 2, FIG. 2 shows a series of spectral characteristics of the two-color pulsed fiber laser. a. Coarse tuning range of the passively mode-locked fiber laser at 1.0 μm, tuned by the intracavity filter (F1, ~8.0 nm passband). b. Fine tuning range of the Stokes beam, 1010-1060 nm, tuned by the slit in the pulse compressor, i.e., the lower right dotted rectangle in FIG. 1, which has an effective passband of ~1.0 nm. c. Tuning range of the coherent wavelength generator at 1.5 μm, tuned by the intracavity filter (F2, <1.0 nm passband). d. Typical SHG spectrum centered at 789 nm, i.e., the pump beam. It is noted that the intensities of all figures have been normalized. e. SRS spectra of methanol sample in comparison to their spontaneous Raman (SR) spectra. f. SRS spectra of dimethyl sulfoxide (DMSO) sample in comparison to their spontaneous Raman (SR) spectra.

Figure 3:
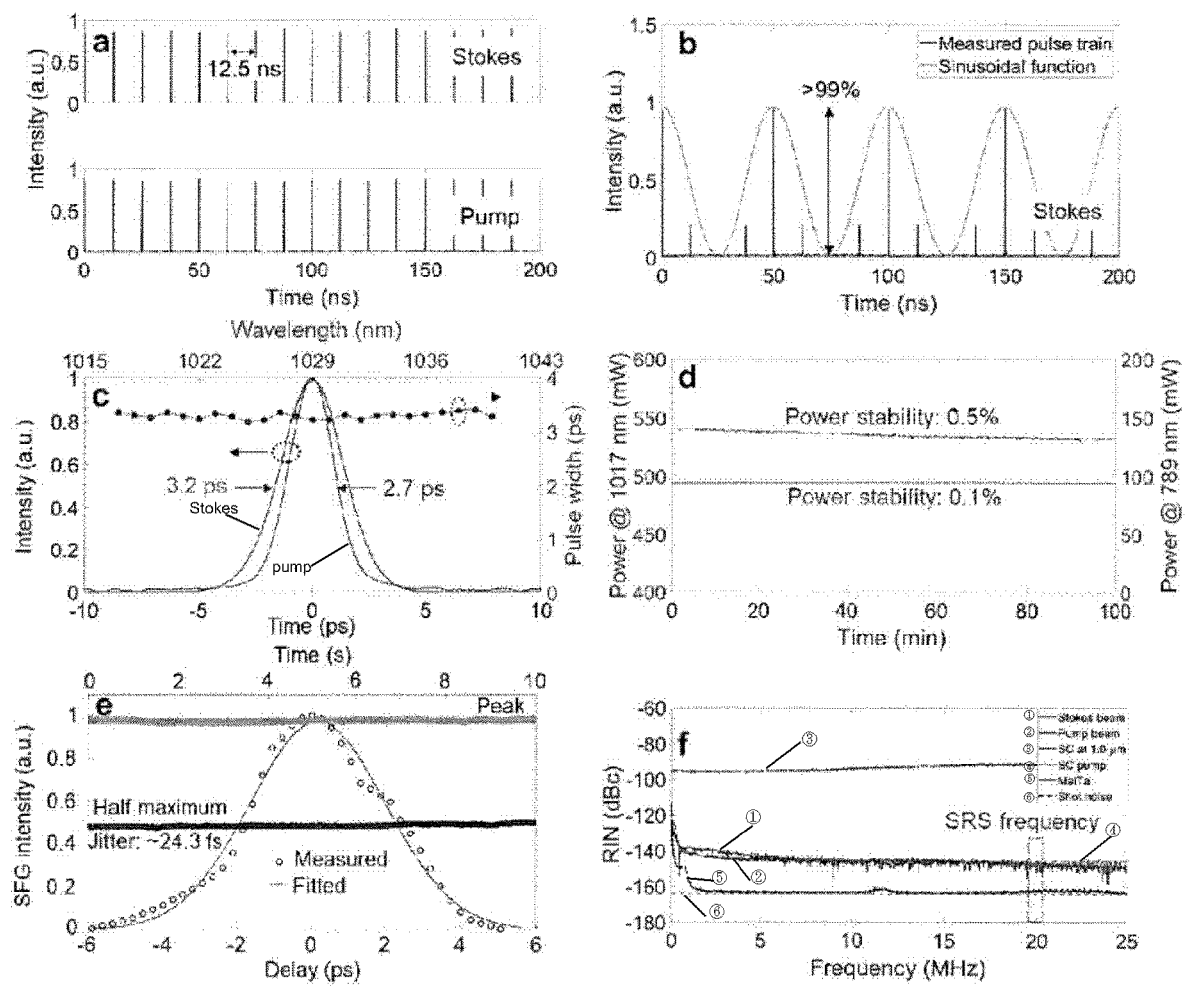
FIG. 3 shows a series of six temporal characteristics of a two-color pulsed fiber laser in accordance with an embodiment herein.

Now referring to FIG. 3, FIG. 3 shows a series of temporal characteristics of the two-color pulsed fiber laser. a. Real-time pulse trains of the Stokes and pump beams at 1017 nm and 789 nm, respectively, recorded by a 20 GHz real-time oscilloscope. Extended pulse trains (up to 500 μs) of the Stokes and pump beams are also provided in FIG. S6, which details the exceptionally low intensity noise of this two-color pulsed fiber laser. b. Real-time pulse train of the Stokes beam modulated by a 20 MHz sinusoidal function. The modulation depth is higher than 99%. c. Autocorrelation traces of the pump and Stokes beams and the pulse width stability of the Stokes beam over the tuning range. d. Long-term power stability over 100 minutes of both pump and Stokes beams. In this measurement, the output powers of the pump (789 nm) and Stokes (1017 nm) beams were set to ~100 mW and ~550 mW, respectively. Their root-mean-square (RMS) power fluctuations are only 0.1% and 0.5%, respectively. e. Optical cross-correlation measurement through sum-frequency generation (SFG). Gray and black curves show the monitored SFG intensities at the peak and half maximum of the optical cross-correlation trace (blue). f. Relative intensity noise (RIN) spectra of the two-color pulsed fiber laser, compared with a standard solid-state fs laser (Spectra-Physics MaiTai) and a typical supercontinuum (SC) fiber laser.

FIG. 3a depicts the real-time pulse trains of the pump and Stokes beams, as measured by a 20 GHz real-time oscilloscope. The uniform intensities over the long real-time pulse trains indicate a low intensity fluctuation, which is crucial for high quality SRS imaging. The benefit of the fiber-based intensity modulation for SRS imaging is presented in FIG. 3b, which shows a modulation depth of more than 99%. This all-fiber modulation scheme with large modulation depth is well suited for the lock-in detection of SRS signals and is a powerful alternative to cost intensive free-space acousto- or electro-optic modulation (AOM/EOM) schemes. The pulse widths of both pump and Stokes beams are measured to be about 2.7 ps and 3.2 ps, respectively, as shown in FIG. 3c, providing a reasonable compromise between signal strength and molecular sensitivity. Notably, unlike standard OPO-based two-color lasers that suffer from a large variation in pulse width when their wavelengths are tuned across a wide range in hyperspectral CRS experiments, our two-color fiber laser exhibits a constant pulse width over the tuning range, i.e., 3.2±0.06 ps, corresponding to a variation of only 1.8%, which is crucial for a high fidelity of the obtained spectral data.

Since the modulation transfer from the Stokes to the pump beam in SRS is, however, very weak, the noise performance of laser sources is a critical parameter, which, so far, has required the use of balanced detection schemes when fiber-based laser sources were utilized. The noise performance of our two-color pulsed fiber laser is studied on both short- and long-term time scales. To evaluate the power stability over a long time period, usually of concern for the long-term imaging of biological samples, the average powers of the pump and Stokes beams are set to about 100 mW and 550 mW, respectively, and then monitored over 100 minutes (FIG. 3d). Within such a long time period, the fluctuations of the optical power are only 0.1% and 0.5% for the pump and Stokes beams, respectively. The timing jitter between pump and Stokes pulses is estimated from the intensity fluctuation of a sum-frequency generation (SFG) signal obtained by focusing the beams into a beta barium borate (BBO) crystal. FIG. 3e shows the optical cross-correlation trace measured by precisely scanning the delay between the pump and Stokes beams, while the gray and black curves are the SFG intensities monitored over 10 seconds at two different delays, i.e., 0 ps (peak) and 2 ps (half maximum), respectively. The timing jitter is thus calculated from the intensity fluctuation of the SFG signal and the slope of the cross-correlation trace to be about 24.3 fs, i.e., ~0.8% of the pulse width. The relative intensity noise (RIN) of the two-color beams is also characterized and compared with a standard solid-state fs laser (Spectra-Physics MaiTai) and a typical SC-based fiber laser (FIG. 3f). At the modulation frequency for SRS imaging, i.e., 20 MHz, the pump and Stokes beams of our fiber laser have similar noise levels, i.e., about −147 dBc/Hz and −148 dBc/Hz, respectively. Please note that this performance distinguishes this laser source from other designs, where one of the two-color beams usually suffers from degraded noise performance after the nonlinear conversion processes. Here, these two-color beams exhibit equally low RINs, since the RIN of the pump beam has been improved by 50 dB compared with previous implementations—a key requirement for high quality SRS imaging without the need for balanced detection.

After spatial and temporal overlapping of the pump and Stokes beams using a dichroic mirror (DM) and an optical delay line (DL), the combined beams are coupled into our custom-built laser scanning microscope.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:
1. A fiber laser system, comprising:
    a master laser cavity for generating a master laser beam;
    a beam splitter for splitting the master laser beam into a first beam for generating a first color pulsed laser beam and a second beam for generating a second color pulsed laser beam; and a synchronization component configured to synchronize the first color pulsed laser beam and a second color pulsed laser beam based on coherent wavelength generation, wherein the master laser cavity is a passively mode-locked fiber laser, and the master laser cavity comprises a piece of ytterbium-doped fiber, a drop-in polarization controller and a fiber-based optically integrated module.

2. The fiber laser system according to claim 1, wherein, each of the first pulsed laser beam and the second pulsed laser beam independently has a pulse width of 10 picoseconds or less or 10 femtoseconds or less.

3. The fiber laser system according to claim 1, wherein, each of the first pulsed laser beam and the second pulsed laser beam independently has a wavelength from 900 nm to 2200 nm.

4. The fiber laser system according to claim 1, wherein, the first pulsed laser beam is a Stokes beam, and the second pulsed laser beam is a pump beam, and the output power of the Stokes beam is greater than the output power of the pump beam.

5. The fiber laser system according to claim 1, wherein, the master laser cavity further comprises a photodiode for generating a system trigger signal.

6. The fiber laser system according to claim 1, wherein, the synchronization component is a coherent wavelength generation oscillator.

7. The fiber laser system according to claim 1, wherein, the beam splitter is a fiber optic coupler.

8. The fiber laser system according to claim 1, further comprising a first double-cladded fiber amplifier for the first color pulsed laser beam and a second double-cladded fiber amplifier for the second color pulsed laser beam.

9. The fiber laser system according to claim 1, further comprising a dichroic mirror for spatially combining the first color pulsed laser beam and the second color pulsed laser beam.

10. The fiber laser system according to claim 1, further comprising a delay line for temporally overlapping the first color pulsed laser beam and the second color pulsed laser beam.

11. A method for pump-probe applications with the fiber laser system according to claim 1, comprising:
splitting a master laser beam into a first beam for generating a first color pulsed laser beam and a second beam for generating a second color pulsed laser beam; and
synchronizing the first color pulsed laser beam and a second color pulsed laser beam based on coherent wavelength generation.

12. The method according to claim 11, further comprising:
generating the first pulsed laser beam with a pulse width of 10 picoseconds or less or 10 femtoseconds or less; and
generating the second pulsed laser beam with a pulse width of 10 picoseconds or less or 10 femtoseconds or less.

13. The method according to claim 11, further comprising:
generating the first pulsed laser beam with a wavelength from 900 nm to 2200 nm; and
generating the second pulsed laser beam with a wavelength from 900 nm to 2200 nm.

14. The method according to claim 11, further comprising:
spatially combining the first color pulsed laser beam and the second color pulsed laser beam.

15. The method according to claim 11, further comprising:
temporally overlapping the first color pulsed laser beam and the second color pulsed laser beam.

16. A fiber laser system, comprising:
a master laser cavity for generating a master laser beam;
a beam splitter for splitting the master laser beam into a first beam for generating a first color pulsed laser beam and a second beam for generating a second color pulsed laser beam, the first beam and the second beam are initially asynchronous; and
a synchronization component configured to synchronize the first color pulsed laser beam and a second color pulsed laser beam based on coherent wavelength generation,
wherein, the synchronization component is a coherent wavelength generation oscillator, and
the coherent wavelength generation oscillator comprises a piece of erbium-doped fiber, a drop-in polarization controller, a fiber-based optically integrated module and a wavelength-division multiplexing coupler; wherein the wavelength-division multiplexing coupler is used to receive external injections.

* * * * *